United States Patent [19]

Hay, II et al.

[11] 4,419,167
[45] Dec. 6, 1983

[54] HEAT SEALING APPARATUS AND METHOD

[75] Inventors: Robert A. Hay, II, Midland; Oswald Bergman, Freeland, both of Mich.

[73] Assignee: The Dow Chemical Company, Midland, Mich.

[21] Appl. No.: 376,986

[22] Filed: May 10, 1982

[51] Int. Cl.³ .................... B30B 5/06; B30B 15/34
[52] U.S. Cl. .......................... 156/290; 156/308.4; 156/553; 156/583.5; 493/193; 493/205; 493/206; 493/208
[58] Field of Search ............... 156/515, 553, 583.1, 156/583.5, 290, 251, 308.4; 493/192, 197, 205, 206, 208

[56] References Cited

U.S. PATENT DOCUMENTS 3,004,881 10/1961 van der Meulen ............... 156/553
3,883,386 5/1975 Garbini et al. ................. 156/583.5
4,198,259 4/1970 van der Meulen ............... 156/553
4,244,772 1/1981 Achelpohl .................... 156/583.5

Primary Examiner—Michael G. Wityshyn
Attorney, Agent, or Firm—R. B. Ingraham

[57] ABSTRACT

Profiled heat seals in plastic film are provided by opposed profiled heat sealing platens supported on endless chains. The platens are heated by contact with associated heating drums.

7 Claims, 7 Drawing Figures

HEAT SEALING APPARATUS AND METHOD

Oftentimes plastic film is produced in the form of tubes. The tubes are flattened, transversely sealed and cut apart between the seals to provide a plurality of synthetic resinous thermoplastic bags. Such bags are employed for a variety of packaging purposes. Some such bags are provided with integral closures generally consisting of generally interlocking groove and land on opposed inner surfaces of a bag generally adjacent the mouth thereof. One of the commonly employed methods for providing the transverse seal in a thermoplastic film tube and forming the bottom of the bag is to employ a heated wire; the heated wire extending transversely to the longitudinal direction of the flattened thermoplastic tube is passed through the tube to fuse the adjacent portions of the film and also to sever the film in the region of the so-formed seals. For many applications, such a seal is satisfactory. However, for other applications where relatively heavy objects are to be packaged or where an internal pressure may be developed within the bag, such as an application where food is to be heated or cooked in a closed bag, a more substantial seal is desired. A seal formed by the application of a hot wire to a flattened thermoplastic tube may be referred to as a linear seal, as the seal is of generally constant configuration across the flattened tube. In order to obtain maximum strength in the seal region, it is often desired to apply a so-called profiled seal. By a "profiled seal" is meant a seal that is other than linear. Generally, such a profiled seal, for maximum strength, has an outwardly curving configuration when considered from the interior of a bag. Such seals can be made by providing a conventional jaw type heat sealer with platens having the desired profiled configuration formed on their film contacted surfaces. Such reciprocating jaw heat sealers can provide desirable high strength profiled seals. Depending on the configuration of the platens, they can be utilized also to sever the tube, or permitted to remain as a continuous length with the severing continued in another operation. Generally, such reciprocating heat sealers may be manually operated or automated. If automated, intermittent motion is required which generally leads to either high maintenance and/or a relatively slow production rate.

It would be desirable if there were available an improved heat sealing apparatus for the preparation of profiled heat seals in synthetic resinous thermoplastic film.

It would also be desirable if there were available an improved method for the preparation of profiled heat seals in synthetic resinous thermoplastic film.

It would also be desirable if there were available an improved method and application for the preparation of profiled heat seals in synthetic resinous thermoplastic film which utilized continuous motion to the exclusion of intermittent motion.

These benefits and other advantages in accordance with the present invention are achieved in a heat sealing apparatus, the heat sealing apparatus comprising a frame, the frame supporting a first heating drum rotatably supported thereon and a second heating drum rotatably supported thereon; the first and second heating drums having generally parallel axes, the first heating drum having associated therewith a first sealing chain, the first sealing chain comprising a plurality of flexibly connected, transversely extending profiled sealing members; the second heating drum having associated therewith and driven thereby a similar chain and a plurality of sealing elements; the first chain in a region generally adjacent the second drum having at least two rotatable chain support elements disposed in a plane generally parallel to the axes of the first and second heating drums, the plane being generally normal to a plane containing said axes; a second pair of rotatable chain support elements generally parallel to said first chain support elements supporting the second chain; said first and second pair of support elements positioned such that the heat sealing elements of the first and second chains disposed in the region between the first and second pair of chain supporting elements brings the sealing members of the first and second chains into a heat sealing position; and means to synchronously rotate the first and second heating drums.

Also contemplated within the scope of the invention is a method for the continuous heat sealing of synthetic resinous thermoplastic film comprising providing a first plurality of heat sealing elements, providing a second plurality of heat sealing elements, continuously moving the first and second set of heat sealing elements to provide intermittent positioning of members of the first and second set of heat sealing elements in heat sealing relationship to each other, while providing heat to the heat sealing elements by conduction at a location remote from the heat sealing elements when the heat sealing elements are disposed in heat sealing relationship.

Further features and advantages of the present invention will become more apparent from the following specification taken in connection with the drawing wherein, FIG. 1 is a schematic representation of a heat sealing apparatus in accordance with the present invention;

Figure 5:
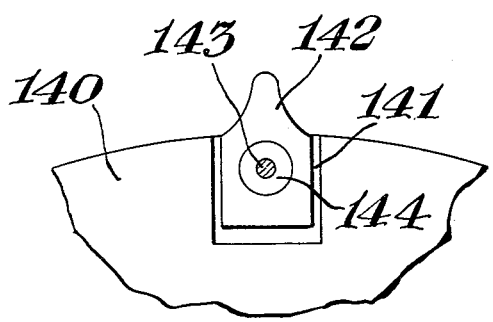
Figure 6:
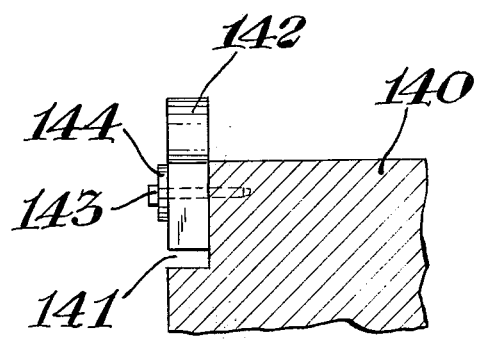
Figure 7:
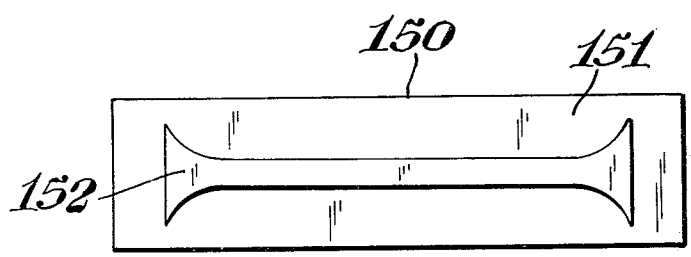

FIGS. 5 and 6 schematically depict the manner of mounting sprocket teeth on the heating drums;

FIG. 7 is a schematic representation of a heat sealing element useful with the apparatus and method of the present invention.

Figure 1:
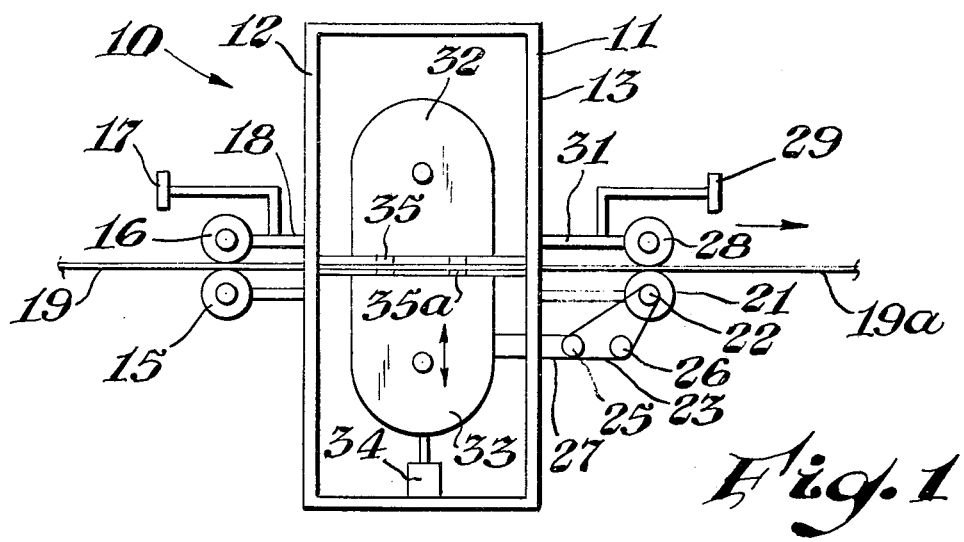

In FIG. 1 there is schematically depicted a side view of an apparatus in accordance with the invention generally designated by the reference numeral 10. The apparatus 10 comprises a frame 11 having a first or entry end 12 and a second or exit end 13. The frame 11 adjacent the entry end 12 and external to the frame supports rotatably a first roll 15. A second roll 16 is rotatably supported adjacent the first roll 15. The second roll 16 is urged toward the first roll 15 by means of weight 17 supported on arm 18 which is pivotally affixed to the frame 11 by a pivot not shown. A flattened tube 19 passes between the rolls 15 and 16. The rolls 15 and 16 together form a web or tube tensioning means. A first driven roll 21 is rotatably supported by the frame 11 at the exit end 13 and external to the frame 11. The roll 21 is rotated by a sprocket 22 which has passing thereover a sprocket chain 23 which is driven by drive sprocket 25 and idler sprocket 26 which is adjustably mounted by means not shown. The drive sprocket 25 is rotated by means of sprocket chain 27 driven by means not shown.

A roll 28 is rotatably supported adjacent roll 21 and is tensioned toward roll 21 by means of the weight 29 which is supported on an arm 31 pivotally affixed to the frame 11 by means not shown. A first sealing means enclosure or shroud 32 is affixed to the frame 11. A second sealing means shroud 33 is supported by the frame 11 by means of a linear actuator 34. The linear actuator 34 positions the shroud 33 in a direction indicated by the double headed arrow. Between the shrouds 32 and 33 are shown a first pair of heat sealing elements 35 and a second pair of heat sealing elements 35a. A transversely sealed web 19a is disposed between rolls 28 and 21 at generally adjacent end 13 of the apparatus 10.

Figure 2:
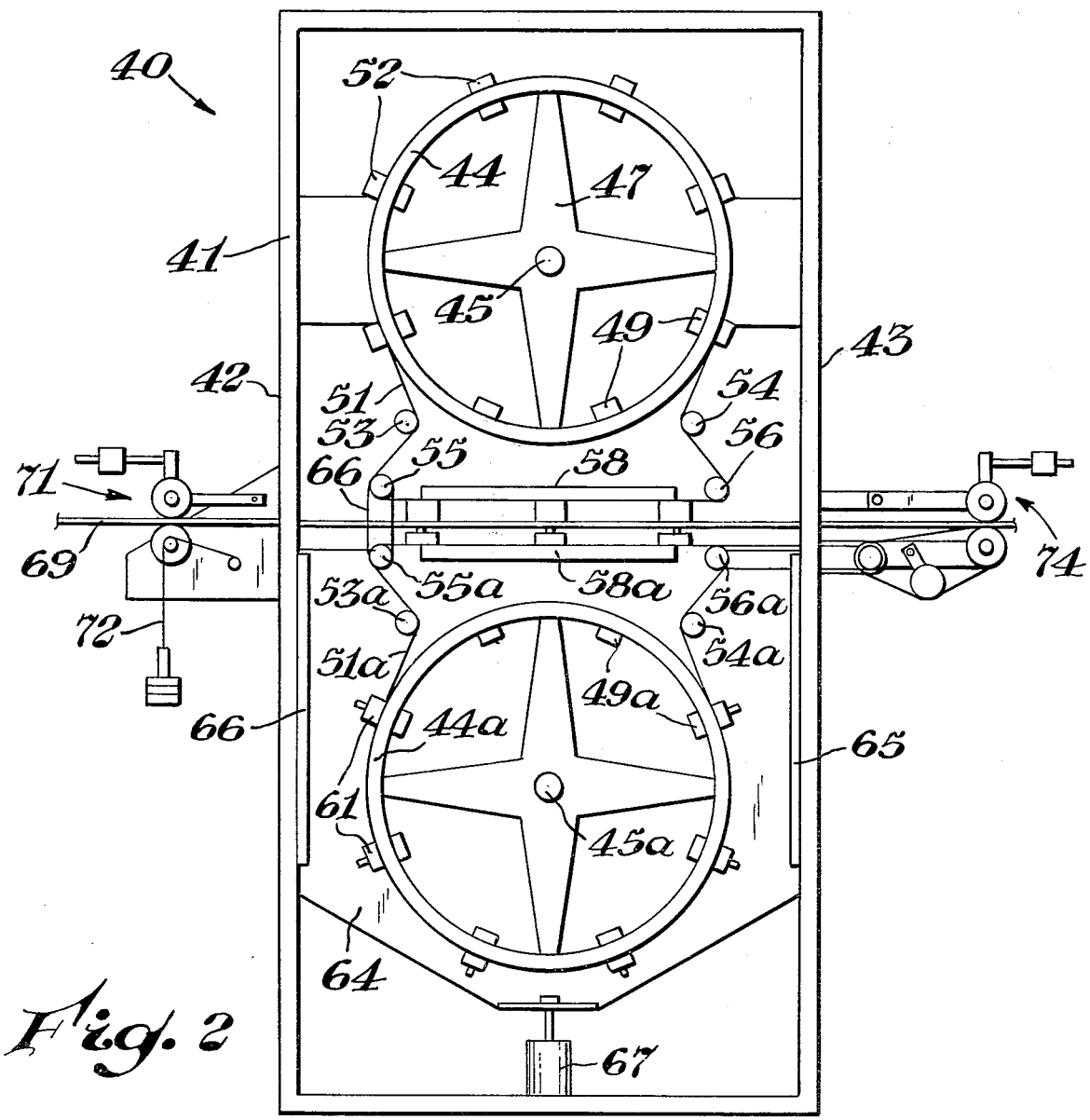
FIG. 2 is a schematic partially-in-section view of a heat sealing apparatus in accordance with the invention showing its basic operation.

In FIG. 2 there is schematically depicted a schematic cutaway view of a heat sealing apparatus in accordance with the present invention generally designated by the reference numeral 40. The apparatus 40 has a frame 41 having an entrance end 42 and an exit end 43. Disposed within the frame 41 is rotatably mounted a first heating drum 44. The drum 44 rotates about a shaft 45. The drum 44 is a hollow cylinder of a thermally conductive metal such as aluminum. The drum 44 is supported on shaft 45 by means of a spider 47. A plurality of heating elements 49 are affixed to an inner surface of the drum 44. Advantageously, the heating elements 49 are electrical strip heaters and extend in a direction generally parallel to the axis of shaft 45 and the axis of generation of the drum 44. The drum 44 has associated therewith an endless chain assembly 51. The chain assembly 51 comprises two roller chains having a plurality of heat sealing elements 52 extending therebetween. The chain assembly 51 is in engagement with the drum 44 for about 270°. The chain assembly 51 passes about a first idler roll 53, a second idler roll 54, a first drive sprocket 55 and a third idler roll 56. Between the drive sprocket 55 and the idler roll 56, the chain 51 forms a generally planar configuration and passes over a first chain positioning means or backup plate 58, disposing associated heat sealing elements 52 in a generally planar configuration in a location between the drive sprocket 55 and the third idler roll 56. The drum 44, the chain assembly 51 and plate 58 form essentially one-half of the active parts of the heat sealing assembly 40. A second heating drum 44a is positioned generally parallel to drum 44. The drum 44a has a plurality of heating elements 49a arranged as the heating elements 49 of drum 44. A chain assembly 51a passes over drum 44a generally as chain 51. Idler rolls 53a, 54a, 56a and sprocket 55a are in engagement with chain 51a in a manner similar to the first portion of the heat sealing apparatus. The chain positioning means 58a is disposed in generally parallel relationship to the positioning means 58. The chain 51a has affixed thereto a plurality of profiled heat sealing elements generally indicated by the reference numeral 61. The sprockets 55 and 55a have disposed therebetween a drive means 66. The drum 44a, drive sprocket 55a and idler rolls 53a, 54a and 56a are supported in the frame 41 on a movable mount 64. The mount 64 is slidably supported in the frame 41 on ways 65 and 66. Linear actuator 67 is affixed to the frame 41 and to the mount 64. The linear actuator as depicted in FIG. 2 is in the extended position bringing the heat sealing elements 52 and 61 in the region of the plates 58 and 58a into contact with a flattened tube 69 of synthetic resinous thermoplastic film to be sealed. Adjacent the first end 42, there is disposed a nip roll assembly 71 having a friction brake 72 on one roll of the assembly. At the exit end 43 is a driven nip roll assembly 74 wherein one of the rolls of the assembly 74 is driven. In operation of an apparatus such as that depicted in FIGS. 1 or 2, the heaters such as the heaters 49 and 49a serve to heat the drums 44 and 44a which in turn by conduction heat the sealing assemblies 52 and 61 which are adjacent or in contact with the drum 44 or 44a. As a drum, such as the drum 44 or 44a is rotated about shafts 45 and 45a respectively, the chains 51 and 51a rotate about the drums carrying with them the associated heat sealing elements 52 and 61. The phasing between the chains 51 and 52 is adjusted so that the heat sealing elements 52 and 61 in the region between the plates 58 and 58a are in heat sealing engagement with a web such as the web 69.

Figure 3:
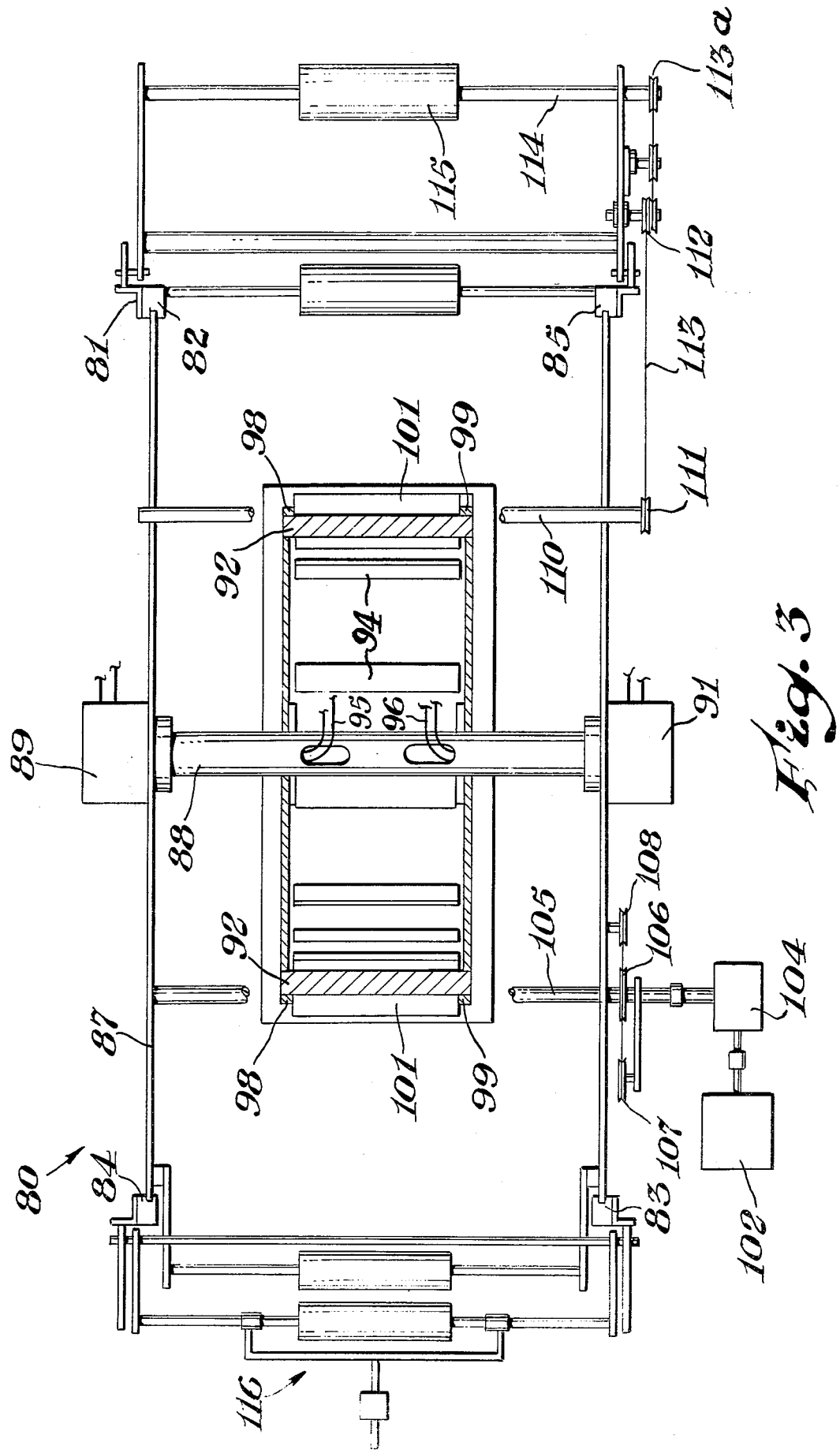
FIG. 3 is a schematic sectional view of a heat sealing apparatus in accordance with the invention.

In FIG. 3 there is schematically depicted a sectional view through an apparatus in accordance with the invention generally designated by the reference numeral 80. The apparatus 80 comprises a frame 81. The frame 81 has affixed thereto ways 82, 83, 84 and 85. The ways 82 through 85 have supported therein a movable frame 87. The frame 87 is positioned by means of a linear actuator (not shown) such as the actuator 57 of FIG. 2. The movable frame supports a rotatable shaft 88. The shaft 88 is hollow and terminates at one end within an electrical connector or slip ring assembly 89. A second slip ring assembly 91 is connected to the opposite end of shaft 88. A hollow drum 92 is affixed to the shaft 88 by means of a spider as depicted in FIG. 2. Disposed within the drum 92 are a plurality of heating elements 94, connected to a source of power by means of conductors 95. The conductors 95 are in communication with the slip ring assembly 89 and receive power from it. A plurality of conductors 96 are in communication with thermocouples within the heating elements and with the slip ring assembly 91. For purposes of illustration, a representative pair of conductors are shown in FIG. 3 whereas in actual practice considerably more wiring is required to provide the desired function. On the external surface of the drum 92 is depicted a first endless belt or roller chain 98 adjacent one end of the drum 92. A second endless belt or roller chain 99 is disposed adjacent the opposite end of the drum 92. Thermally conductive heat sealing elements 101 extend between the chains 98 and 99 and are in spaced apart relationship as indicated with the elements 52 and 61 of FIG. 2. The drum 92 has sprocket teeth not shown which engage the chains 98 and 99. A source of rotary motion such as an electric motor is in operative engagement with a right angle gear reducer 104, which in turn rotates a shaft 105 which is equivalent to sprocket 53a of FIG. 2. Generally adjacent the movable frame 87 is disposed a drive sprocket 106 and an idler sprocket 107. The sprockets 106 and 107 are engaged with a sprocket 108 disposed on a fixed housing not shown. Sprocket 107 serves as an idler and chain tightener. A shaft 110 has a sprocket 111 generally equivalent to sprocket 56 of FIG. 2, and is in operative engagement with sprocket pair 112 by means of drive chain 113. One of the sprocket pairs 112 is in operative engagement with sprocket 113a on shaft 114 to drive a material takeaway roll 115. A pinch roll assembly 116 is shown with the rolls laterally displaced. The assembly 116 is generally equivalent to the assembly 71 of FIG. 2.

Figure 4:
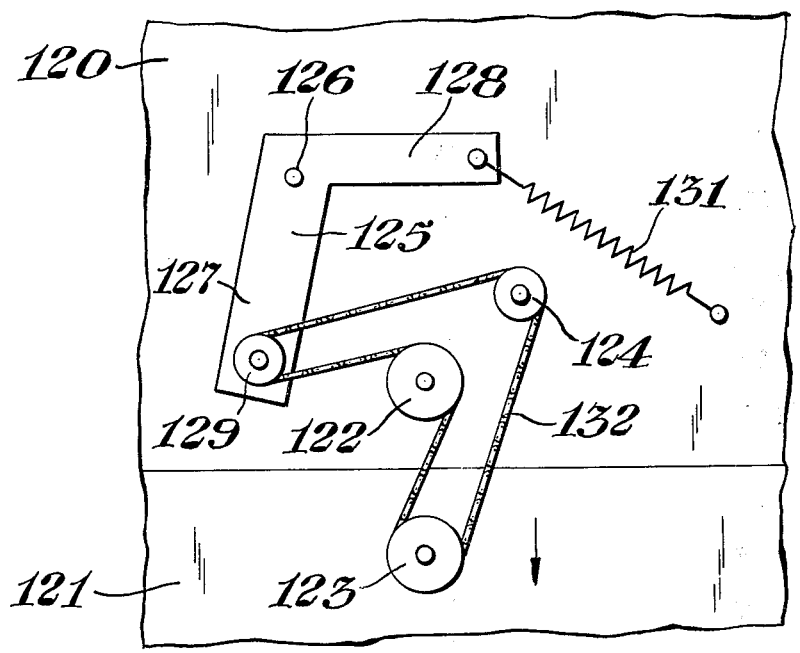
FIG. 4 is a schematic representation of a means of transmitting rotary motion from one heating drum to another.

FIG. 4 is a schematic representation of power transmission between a fixed frame 120 and a movable frame 121. A first sprocket 122 is supported on fixed frame 120 that is generally equivalent to sprocket 55 of FIG. 2. A second sprocket 123 is affixed to the movable frame 121 equivalent to the fixed frame in FIG. 2. A third sprocket 124 is affixed to the fixed frame 120. A bell crank 125 is pivotally affixed to the fixed housing 120 by means of pivot 126. The bell crank 125 is generally concave toward sprocket 122 and has a first arm 127 and a second arm 128. The first arm 127 is generally adjacent sprocket 122. The second arm 128 is generally adjacent sprocket 124. A sprocket 129 is affixed to arm 127 of bell crank 125. A helical extension spring 131 has one end affixed to arm 128 of bell crank 125 and the opposite end affixed to housing 120. A motion transmitting means or roller chain 132 in the form of a closed loop passes over sprocket 122, under sprocket 123, over sprocket 124 and about sprocket 129, and back to sprocket 122 to make a chain configuration somewhat resembling a "V". When the housing 121 is moved in the direction indicated by the arrow and sprockets 122 and 123 move further apart, the bell crank pivots about the pivot 126 and approaches sprockets 122 and 124, thereby maintaining synchronization between each of the chains carrying the heat sealing elements.

In FIGS. 5 and 6 there are depicted fractional sectional views of sprocket teeth mounted on a drum such as the drum 92 of FIG. 3 and the drums 44 and 44a of FIG. 2, a portion of the drum being indicated by the reference numeral 140. The drum 140 defines a generally rectangular recess designated by the reference numeral 141. In the recess there is inserted a sprocket tooth 142. The sprocket tooth is held to the drum by means of a shoulder screw 143. A flat washer 144 is disposed between the head of the screw 143 and the tooth 142. The screw 143 threadably engages the drum 140 and retains the sprocket tooth 142 within the recess 141. The screw 143 is of appropriate length so that the tooth may rotate to a limited degree depending upon the size of the recess 141. Such an arrangement is particularly desirable when the drum such as the drums 44 and 44a are of aluminum and the roller chain is of steel. In such an arrangement, when the drum is heated, the tension change will be greater than the tension change in the chain. Therefore, misalignment of the teeth in spaces of the roller chain are avoided by pivotally mounting the sprocket teeth on the drum.

In FIG. 7, there is schematically depicted a face view of a sealing element useful in the apparatus of the present invention. The sealing element has a generally rectangular body 150. The body 150 has a generally planar face 151 having defined thereon a generally I-shaped land 152. Such a platen when heated and brought together with a like platen or a flat platen will from a profiled seal in a flattened tube placed therebetween.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A heat sealing apparatus, the heat sealing apparatus comprising a frame, the frame supporting a first heating drum rotatably supported thereon and a second heating drum rotatably supported thereon; the first and second heating drums having generally parallel axes the first heating drum having associated therewith a first sealing chain, the first sealing chain comprising a plurality of flexibly connected, transversely extending profiled sealing members; the second heating drum having associated therewith and driven thereby a similar chain and a plurality of sealing elements; the first chain in a region generally adjacent the second drum having at least two rotatable chain support elements disposed in a plane generally parallel to the axes of the first and second heating drums, the plane being generally normal to a plane containing said axes; a second pair of rotatable chain support elements generally parallel to said first chain support elements supporting the second chain; said first and second pair of support elements positioned such that the heat sealing elements of the first and second chains disposed in the region between the first and second pair of chain supporting elements brings the sealing members of the first and second chains into a heat sealing position; and means to synchronously rotate the first and second heating drums.

2. The apparatus of claim 1 including first and second shrouds at least partially enclosing the first and second heating drums.

3. The apparatus of claim 1 including a feed roll assembly disposed adjacent a first end of the apparatus and a takeaway roll assembly disposed adjacent and opposite the apparatus.

4. The apparatus of claim 1 wherein the first and second sealing chains comprise first and second roller chains affixed to ends of the transversely extending profiled sealing members.

5. The apparatus of claim 1 wherein the heating drum has an inner surface having disposed thereon electrical heating elements.

6. The apparatus of claim 1 including an extendable drive chain linkage between a first drum and a second drum.

7. A method for the continuous heat sealing of synthetic resinous thermoplastic film comprising providing a first set of a plurality of heat sealing elements, providing a second set of a plurality of heat sealing elements, continuously moving the first and second sets of heat sealing elements to provide intermittent positioning of members of the first and second sets of heat sealing elements in heat sealing relationship to each other, while providing heat to the heat sealing elements by conduction at a location remote from the heat sealing elements when the heat sealing elements are disposed in heat sealing relationship.

* * * * *